Mosher & Eddy.

Shovel Plow.

BEST AVAILABLE COPY

No. 3,545. Reissued Jul. 6, 1869.

WITNESSES:

J. E. Salthroh

F. W. Dow

INVENTOR:

Jesse Mosher
Walden Eddy
Marcus P. Norton
their attorney
of Rec

A. PETERS, PHOTO-LITHOGRAPHER, WASHINGTON, D. C.

BEST AVAILABLE COPY

UNITED STATES PATENT OFFICE.

ISRAEL MOSHER, OF MOSHERVILLE, AND WALDEN EDDY, OF UNION VILLAGE, NEW YORK.

IMPROVEMENT IN SHOVEL-PLOWS.

Specification forming part of Letters Patent No. 38,056, dated Mar. h 31, 1863; Reissue No. 3,545, dated July 6, 1869.

*To all whom it may concern:*

Be it known that we, ISRAEL MOSHER, of Mosherville, in the county of Saratoga and State of New York, and WALDEN EDDY, of Union village, in the town of Greenwich, county of Washington, and State aforesaid, did obtain upon our joint application Letters Patent of the United States of America for and upon certain Improvements in Shovel-Plows, which said Letters Patent bear date the 31st day of March, 1863; and we do hereby declare that the following is a full, clear, and exact description of the construction and operation thereof, reference being had to the accompanying drawings, and to the letters of reference marked thereon, which said drawings make a part of this our corrected and re-formed and amended specification.

Like letters represent and refer to like and corresponding parts of our invention and improvements herein contained.

Figure 1:
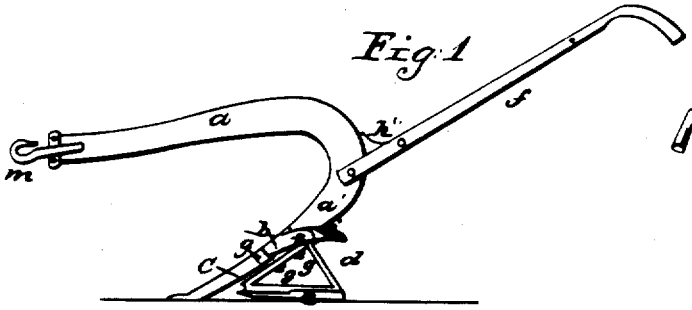
Figure 3:
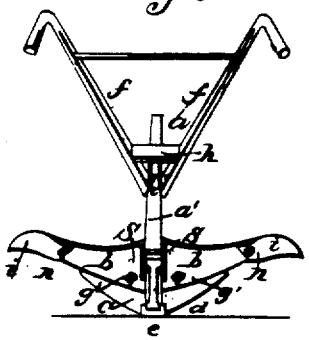
Figure 2:
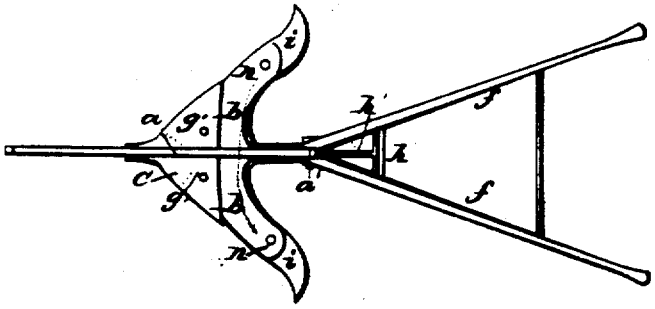
Figure 2:
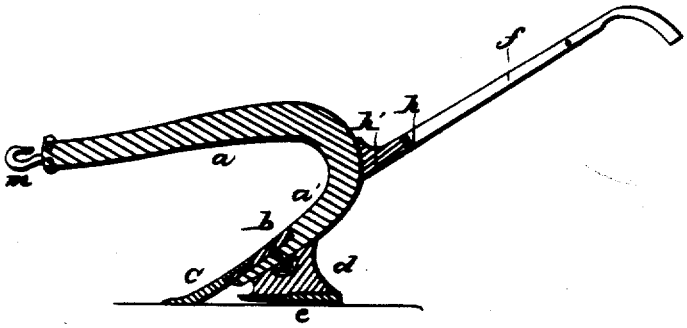
Figure 2:
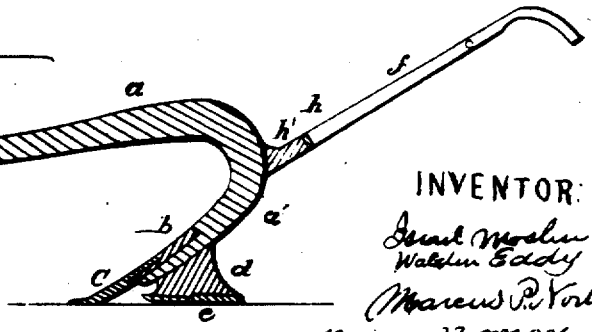

Figure 1 represents a side view of our said plow and containing the several parts of our invention, hereinafter described and set forth. Fig. 2 represents a horizontal plan or view of our said shovel-plow, looking downward from the top thereof. Fig. 3 represents a view from the rear of the shovel-plow, and is an elevation thereof, showing the construction of the under side of the mold-board containing the raised ribs or flanges across the surface of the same, so that there shall be one thereof along and upon each side of the standard of the plow-beam, and each more fully described and set forth hereinafter. Fig. 4 represents and contains two views or sections of Figs. 1, 2, and 3 on a line vertical and lengthwise through the said plow, and each illustrates the construction and arrangement of the several parts of our said plow and improvements relating to the right-angle triangle, to the standard upon the plow-beam, and to the shoe upon such right-angle triangle; also, several other parts of the said shovel-plow; and the said figure also represents and illustrates that part of our said invention and improvements constructed of cast-iron, in the form and for the purposes substantially as hereinafter described and set forth.

The nature of our said invention and improvements consists in the employment and combination of a right-angle triangle constructed of cast-iron or of other suitable material and united to the standard of a shovel-plow to which the mold-board is secured and attached in some suitable manner, so that the depth of the plow to run in the soil shall be regulated thereby, and a firm and steady motion given to the same while it is in use and operation in the field.

It also consists in providing the two outward-extending pieces or parts of the mold-board fastened to the plow-beam standard with an additional curved wing, whereby each of the said wings of said mold-board is extended or continued outward from said mold-board in a curved or other form, substantially the same and so arranged thereupon by means of one bolt passing through that part of the wings of the mold-board upon which rests one end or part of said curved extension, and additional wings, and also through such additional wing itself coming into contact with such mold-board in such manner as to cause or give a more perfect distribution of the earth or soil outward toward and among the growing plants when the said plow is in operation in the field; and the same curved extension and additional wings when worn out and unfit for use may be replaced with new ones without the expense of a new mold-board, in the manner substantially as herein contained, described, and set forth.

It also consists in providing the said right-angle triangle arranged underneath the standard, mold-board, and share, in the manner substantially as herein set forth, with a shoe so constructed with dovetails as to be more easily removed therefrom, for the purpose of repairs or for replacing the same with a new one whenever it shall be desirable so to do, while at the same time the said shoe shall be firmly secured to said right-angle triangle, at the lower side or part thereof, as not liable to be separated therefrom while the said plow is in use and operation in the field, in the manner substantially as herein described and set forth.

It also consists in combining with and securing to a shovel-plow beam or standard the handles used for holding and guiding the plow while in use and operation in the field, in the manner and by the means substantially as herein described and set forth.

It also consists in providing or casting upon the under side of the mold-board ribs, raised flanges, or projections, so as to form a suitable channel or groove to receive and contain that part of the plow-beam standard to which said mold-board is fastened or secured by means of said ribs or flanges raised upon and across the surface of said mold-board, and by one or more bolts, as the case may be, in the manner substantially as herein described and set forth.

It also consists in so arranging and construction and additional wings between, to, and with ing the joint or joining of the curved exten- the outward-projecting part or portion of the mold-board upon each side of the plow-beam standard in such manner that one central bolt, with nut and screw thereon, shall be sufficient to detain each of said curved extension and additional wings in any fixed position of the same while the said plow is in use in the field, in the manner substantially as herein contained, described, and set forth.

It also consists in the arrangement and combination of a plow share or point with a mold-board having and containing curved extension and additional wings or pieces connected therewith by means of a suitable joint, and one bolt at or near a central point, and with nut and screw thereon, and upon each side of the plow-beam standard, in the manner substantially as herein described and set forth.

To enable others skilled in the art to which our said invention and improvements in shovel-plows relate to make and use the same, we will here proceed to describe the construction and operation of the same, and of the several parts thereof, which is substantially as follows, to wit:

*a* represents a plow-beam, made of cast or wrought iron or other suitable material, and bent or curved in the usual manner or in such form and manner as to form and construct the standard *a'*. To such standard is firmly secured or fastened in some suitable manner the mold-board *b b*, and by means of the bolts and nuts *g g*, Fig. 1, which pass through the upper part of the right-angle triangle, or its equivalent *d*, Figs. 1, 3, and 4 of the accompanying drawings, thus and thereby securing the said mold-board and said right-angle triangle to the said standard *a'* of the said plow-beam *a*, substantially as shown at Figs. 1 and 4 of the said drawings. The said right-angle triangle may be of any form or shape upon the several sides of the same, as may be deemed best in the manufacture of our said shovel-plow.

The right-angle triangle aforesaid may be constructed of cast-iron and attached to the said plow-beam standard *a'* in any convenient and suitable manner, substantially as shown at Fig. 4 of the accompanying drawings. The said plow-beam *a* and standard *a'* may be constructed of wrought-iron, while at same time the said right-angle triangle *d* may be made of cast-iron and bolted to the plow-beam standard *a'* in any suitable manner; or the said plow-beam *a* and standard *a'* may, as aforesaid stated, be constructed of cast-iron of any suitable size, form, or shape, and the said right-angle triangle may also be made of cast-iron and attached to the said plow-beam standard *a'* in any convenient manner and by any suitable means; but when said plow beam and standard are made of wrought-iron, the said right-angle triangle must be bolted thereto, substantially as aforesaid and as shown at said Figs. 1 and 4 of the said drawings.

*c* is the share or point firmly secured to the said mold-board *b b*, by means of the bolts and screws *g' g'*, Figs. 2 and 3. To each side of the said mold-board we attach, arrange, and combine the curved extension and additional parts, pieces, or wings *i i*, which is accomplished by the construction of a suitable joint of form and shape substantially as shown at Fig. 2 of said drawings. One end or portion of said curved extension or additional pieces or wings is so constructed as to lap over and upon that narrow and projecting part of the said mold-board to which each of said additional wings is to be attached in such manner and form as to allow of and to receive and contain the central pin or bolt, *n n*, Figs. 1, 2, and 3, which has a suitable screw and nut upon the lower end of the same, substantially as shown at Fig. 3, which nut and screw are for the purpose of loosening and fastening the said curved extension and additional pieces or wings *i i* upon and to the outward projecting parts of said mold-board in such manner as shall be deemed best, in order to throw or distribute the soil more evenly and correctly among the corn, potatoes, or other hills of the growing crops, as well as among and around the same, thus and thereby forming more perfect hills, and which will require little or no hilling by the use of the hoe. It will therefore be seen that the said extension or additional parts or pieces or wings are each secured to the respective outer or projecting parts or portions of the said mold-board by means of the central bolts and nuts, *n n*, Figs. 1, 2, and 3, by the means of which the said wings are held upon, to, and with said mold-board *b b* for any purpose or purposes desired or required in, for, or during the operation of the said plow in the field, as aforesaid, and when the same are thus arranged, then the nuts *n' n'*, Fig. 3, will be turned upon the screw upon said bolt *n n*, thereby bringing the two pieces or joints or surfaces so closely and firmly together as to securely hold the same in such desired and fixed position and condition in, for, and during the use and operation of the plow in the field. It is manifest that said wings or additional extension parts or pieces *i i* may be removed from said mold-board extended parts or projections, for the purpose of repairs or to replace the same with a new one. They may be made of cast or wrought iron, or of semi or cast steel, as the case may require, and the same may be of any length, size or strength found necessary in order to a successful use of the same, which are very necessary and important for the purpose of throwing and distributing the earth and soil among, around, and through the rows and hills of the growing crops, substantially as aforesaid. One central bolt, with nut and screw, as aforesaid, is sufficient to permit of any suitable and fixed arrangement of the said curved extension or additional parts or wings each upon the said projecting parts of the said mold-board for the purposes aforesaid, as well as to hold or firmly secure the same, when so arranged, upon such respective parts or portion of such mold-board while and during the use and operation of the plow in the field, as aforesaid. By loosening the said respective nuts *n′ n′*, the said additional pieces or wings become loose upon said mold-board where the same are respectively arranged and attached, and, on the other hand, by tightening the same nuts of course said additional wings become securely or firmly arranged upon and held to the said mold-board, substantially as hereinbefore stated and set forth. The said right-angle triangle *d*, Figs. 1, 3, and 4, whether made of cast or wrought iron, must be so constructed on the lower end side or part thereof as to receive, contain, and hold the shoe *e* by the dovetail groove therein constructed and arranged in such manner as to continually tighten thereon when the same shall be in use and operation in the field, as aforesaid, and which can be easily taken or removed therefrom for the purpose of repairs or for the replacing the same by a new one, by the driving it forward, which thereby immediately loosens it, so that it can be removed, as aforesaid, whenever so required.

*f f* are the handles used by the operator. *h* is a cross-piece of iron, cast with the said standard *a′* when the same is made of cast-iron, in the manner aforesaid, to which the said handles are connected, combined, and arranged in the manner and by the means substantially as shown and set forth at Figs. 1, 2, 3, and 4 of the accompanying drawings, and they may firmly be bolted thereto by bolts and nuts.

The mold-board *d d*, Figs. 1, 2, and 3, has cast upon the under side thereof ribs or raised pieces or flanges, extending across the width of the same in such manner as to form a channel or groove to receive and hold that part of the standard *a′* to which said mold-board is fastened or secured by means of said bolts and nuts *g g*, Fig. 1, as aforesaid. The said ribs, flanges, or raised pieces may be seen at *s s*, Fig. 3, which may be of any capacity or strength desired, in order to give greater strength to said mold-board, and especially so when bolted to said standard *a′*, as aforesaid stated. The distance between said ribs or raised flanges *s s* will be so made as to correspond to and with the thickness of the said standard *a′*. When such ribs or raised flanges are cast upon said mold-board, substantially as aforesaid, it will only be necessary to use but one of the said bolts *g*, for that will be entirely sufficient to firmly hold in its proper place the said mold-board upon the said standard *a′*. By means of such ribs or raised flanges *s s*, Fig. 3, much greater strength is given to the mold-board *b b*, same figure, and thus and thereby the same will not be as apt to break while in use or operation in the field. They also serve to guide and hold said mold in its proper place upon the said standard *a′*, as they will come into immediate contact with a portion of the sides of the said standard *a′*, substantially as shown at Fig. 3. The said cross-piece *h* is connected with said standard *a′* by means of the extension-piece *h′*, projecting outward from said standard *a′*, and cast therewith, as aforesaid. *h′* may be seen at Figs. 3 and 4 of the accompanying drawings, and the handles *f f* may be securely fastened to the said plow, substantially as shown at Figs. 1, 2, and 4 of said drawings. The said mold-board *b* and the said plow share or point *c* are attached to and combined with the said standard *a′*, and with each other, in the manner substantially as shown at Figs. 2, 3, and 4 of accompanying drawings.

Having thus described the nature, construction, and manner of operating our said invention and improvements, what we claim, and desire to secure by Letters Patent of the United States of America, is—

1. The employment, arrangement, and combination of the right-angle triangle *d*, or its equivalent, with the beam-standard *a′*, or its equivalent, having thereto attached the mold-board *b b*, in the manner and for the purposes substantially as herein described and set forth.

2. The curved extension and additional pieces or wings *i i*, arranged upon and combined with the mold-board *b b*, substantially in the manner and for the purposes herein described and set forth.

3. The employment and combination of the removable shoe *e* with the right-angle triangle *d*, or any equivalent therefor, in the manner and for the purposes substantially as herein described and set forth.

4. The arrangement and combination of the handles *f f* with the plow beam or standard *a*, in the manner and by the means substantially as herein described and set forth.

5. The combination of the plow share or point *c*, mold-board *b b*, and extension and additional curved pieces or wings *i i*, arranged and operating in the manner substantially as herein described and set forth.

6. A mold-board for shovel-plows, constructed with the ribs or raised flanges *s s* upon the under side of the same in such manner as to receive and hold the standard *a′* in the manner substantially as herein described and set forth.

7. The arrangement of each of the aforesaid described curved extension and additional pieces or wings *i i* upon the outward projections of the mold-board *b b*, and the securing or fastening of the same thereto and thereupon by the respective bolts *n* and nuts *n'*, in the manner and for the purposes substantially as herein described and set forth.

In testimony whereof we have hereto set our hands on this 17th day of February, A. D. 1869.

WALDEN EDDY.
ISRAEL MOSHER.

Witnesses:
C. D. KELLUM,
JAMES DALEY.